May 23, 1967  H. W. ZENKE  3,321,185
CABLE DRUM SYSTEM WITH INTER-LAYER SHELLS
Filed Oct. 19, 1965  2 Sheets-Sheet 1

INVENTOR.
HOWARD W. ZENKE
BY
OSTROLENK, FABER, GERB & SOFFEN
ATTORNEYS

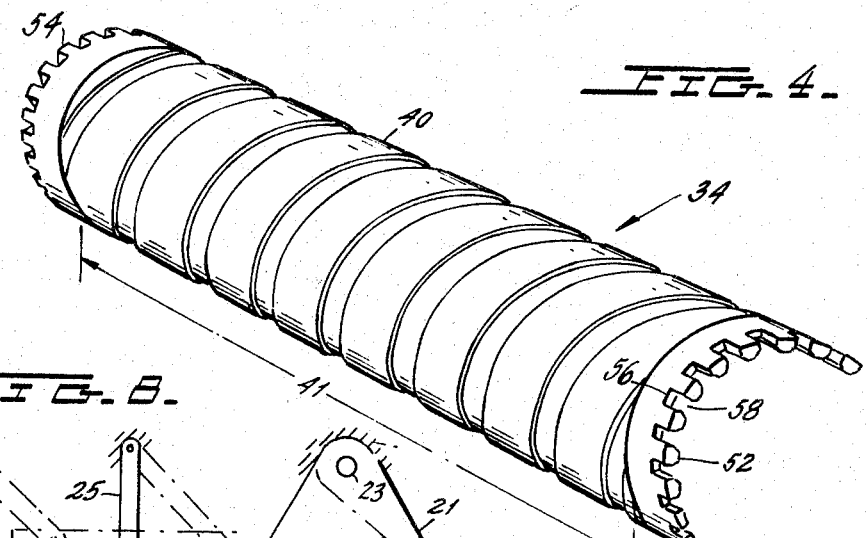
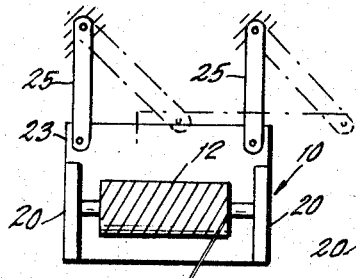
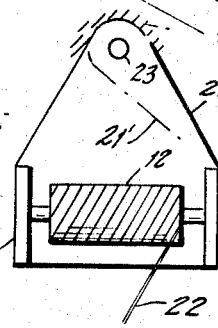
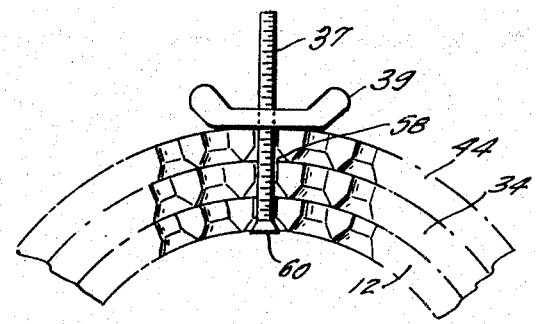
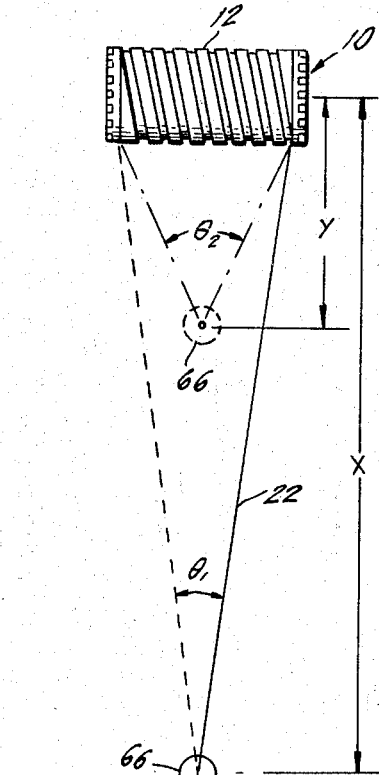

United States Patent Office 3,321,185
Patented May 23, 1967

3,321,185
CABLE DRUM SYSTEM WITH INTER-LAYER SHELLS
Howard W. Zenke, Brooklyn, N.Y., assignor to Letco Engineering and Tool Company, Inc., Brooklyn, N.Y., a corporation of New York
Filed Oct. 19, 1965, Ser. No. 497,827
13 Claims. (Cl. 254—184)

This invention relates to cable winding apparatus and more particularly is concerned with insuring that a continuous length of cable is wound upon a drum in a uniform manner.

In United States patent application Ser. No. 433,009, filed Feb. 16, 1965, in the name of the inventor of the instant application, there is shown and described apparatus for sensing deviation in elevation of a plurality of points about a body being lifted. The instant invention is directed to a cable take-up system which might be used in conjunction with the sensing apparatus of the aforementioned patent application, but has as its primary object the provision of a simple and inexpensive system which insures that a continuous length of cable, the uses for which may be numerous and varied, is wound upon a take-up drum in a uniform manner.

Inherent in the problem of winding succeeding layers of cable upon a drum is the error, in terms of non-uniformity of take-up, which is introduced according to whether the cable being wound rests upon a high point of the previous layer of cable or is located at the low point where adjacent turns of the lower layer meet. This error becomes especially acute in systems such as that shown in the aforementioned patent application wherein it is desirable for a plurality of take-up drums to wind their associated cables at a substantially uniform rate of take-up.

The instant invention eliminates the problems of uneven take-up caused by running newly wound cable over irregularly contoured layers of previously wound cable by providing that each new layer of cable is wound upon a smooth surface in the form of a shell which has been placed upon the take-up drum after the preceding layer of cable has substantially filled the width of the drum. Although such shell may take the form of a flexible tubular member the circumference of which is somewhat less than 360° when the tube is placed on the take-up drum, in the preferred embodiment of the instant invention, the inner layer of shell comprises two semi-cylindrically shaped shells which when positioned on the take-up drum constitute an enveloping cylindrically shaped surface, the circumference of which is somewhat less than 360°.

In operation, the take-up drum is rotated until one layer of the cable has been wound thereacross. At this point the rotation of the drum is halted and the two semi-cylindrically shaped shells are removably and adjustably positioned on the drum, in a manner to be described in further detail, whereby further rotation of the drum will cause the cable to be wound upon the smooth surface represented by the exterior of the cylindrical shells. After a complete layer has been wound across the surface of the shells, rotation is halted once more while a second set of semi-cylindrically shaped shells is removably secured to the shells thereunder. Further rotation of the drum assures that the cable is being wound on the smooth exterior surface of the second set of shells rather than on the uneven surface which would otherwise be presented by the layer of cable immediately below.

In a preferred embodiment of the instant invention, the peripheral surface of the take-up drum is provided with a spiralling channel groove which guidingly winds the cable in a first direction across the surface of the drum in response to rotation thereof. Each of the shells which are to comprise the first inter-layer is provided with a plurality of helical channel grooves which are aligned with the grooves of the other shell when the shells are positioned on the drum, with such aligned helical grooves cooperating to define a continuous spiralling groove, the direction of thread, or pitch, of which is directionally oriented with respect to the spiralling channel groove of the take-up drum to guidingly wind the succeeding layer of cable in the direction opposite the direction of wind of the layer immediately below. It should be noted that both the spiralling channel groove of the take-up drum and the helical grooves provided in the inter-layer shells are preferably of sufficient depth so that the exterior surface of the cable being wound does not protrude beyond the peripheral surface of the drum or shell, respectively.

When the second layer of cable, viz., the layer wound within the channel grooves of the shells, has been substantially or completely filled, rotation of the drum is halted and a second layer of shells is removably secured to the layer of shells thereunder. The second set of shells is similar to the first set but differs in that the direction of thread, or pitch, of the helical grooves therein is opposite to the pitch of the first layer of shells, or in effect the same as the pitch of the spiralling channel grooves of the take-up drum. Consequently when the drum is rotated, the cable will be guidingly wound across the surface of the second layer of shells.

The operation is continued until the desired amount of cable has been wound, it being noted that the reverse pitch of the alternate layers of shells provide a guiding arrangement which eliminates the relatively complex reciprocating guides which are common in prior art cable winding systems.

As a particularly advantageous feature of the instant invention, the entrance to each channel groove of each of the semi-cylindrically shaped shells is tapered to facilitate the entry of cable thereon. Such tapered surfaces further serve to eliminate the jerky take-up which would otherwise accompany a non-tapered surface.

Accordingly, it is an object of the instant invention to provide a cable drum system which insures that a continuous length of cable will be wound on a drum in a uniform manner.

Another object of the instant invention is the provision of a cable drum system which comprises a rotatable cable take-up drum for receiving one layer of a cable which is to be wound upon the drum in response to rotation thereof, and a shell removably secured to the drum with such shell functioning to receive the cable when the peripheral surface of the drum has been filled.

Another object of the instant invention is to provide a cable drum system which utilizes semi-cylindrically shaped shells which are placed upon each layer of cable prior to the winding of the next adjacent layer of cable.

Still another object of the instant invention is to provide such a cable winding system in which the semi-cylindrically shaped shells are provided with helical channel grooves which function to directionally wind cable thereon.

Yet another object of the instant invention is to provide such a cable winding system in which alternate layers of inter-layer shells are provided with a reverse pitch in order to guidingly wind cable upon the drum.

Still another object of the instant invention is to provide such a cable winding system in which the semi-cylindrically shaped shells thereof may be adjustably and removably secured to the take-up drum in a simple manner.

Other objects of the invention may be had by referring to the following description taken in conjunction with the drawings, in which:

FIGURE 4 is an exaggerated perspective view of one of the shells shown in FIGURES 2 and 3;

FIGURE 5 is a somewhat schematic end view of the manner in which a plurality of layers of shells may be removably secured to the drum and one another;

FIGURE 6 is a schematic diagram of the cable drum system illustrated in FIGURES 1-5 and illustrating one manner in which the cable may be oriented with respect to the drum.

FIGURES 7 and 8 are somewhat schematic illustrations of alternative methods by which the cable and drum may be oriented with respect to each other to assure that the shells guidingly direct the oncoming cable.

Figure 1:
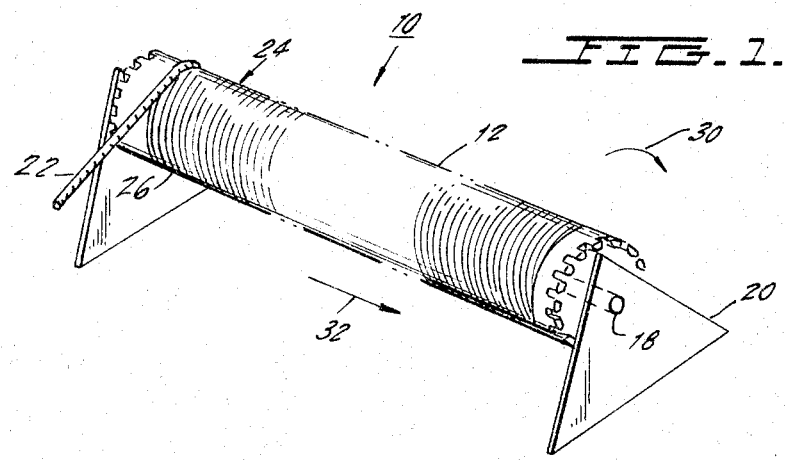
FIGURE 1 is a perspective view of an empty cable take-up drum prior to winding of its associated cable thereon.

Referring to FIGURE 1, there is shown a take-up drum 10 which includes a cylindrical body portion 12 which constitutes a core upon which a single layer of cable will initially be wound. The drum 10 is rotatable about a pivot 18 provided on a suitable frame indicated generally at 20. By suitable driving means (not shown) the drum 10 is selectively rotatable to wind a length of cable 22 upon the central body portion 12.

Figure 2:
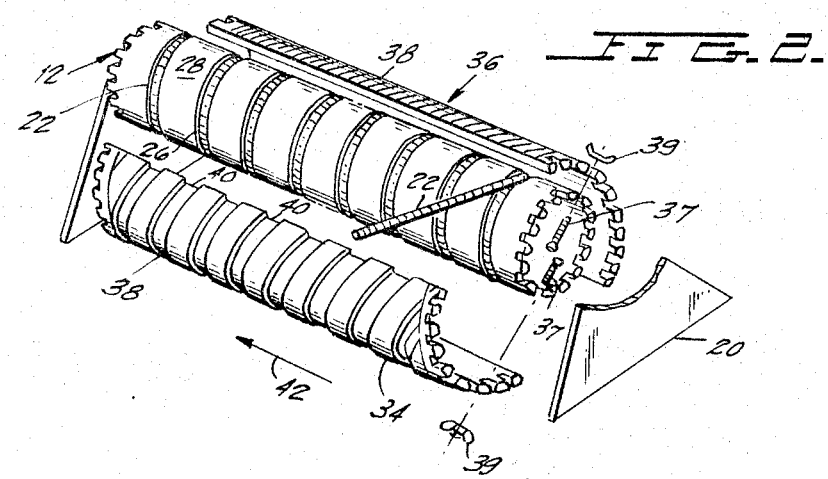
FIGURE 2 is a view similar to that shown in FIGURE 1, but showing in exaggeration the peripheral surface of the cable drum filled with one layer of cable and also showing the contemplated placement of two semi-cylindrically shaped shells thereon.

The exterior surface of the body portion 12 is seen to include a closely spaced spiralling channel groove 24 which in essence reforms the otherwise smooth surface of the drum into an externally threaded surface comprising alternately disposed grooves 26 and raised portions 28 (see FIGURE 2 wherein the threaded surface of the core 12 has been exaggerated for purposes of simplification and illustration). When the drum 10 is rotated in the direction of arrow 30, it will be apparent that the cable 22 will be guidingly wound within the groove 26 of the spiralling channel 24 along the surface of the body portion 12 in a direction corresponding to the arrow 32. Continual rotation of the drum will eventually fill all of the grooves 26 with cable so that one complete layer of cable will reside on the central portion 12 with the incoming cable now intersecting the longitudinal axis of the drum at the opposite end from which rotation began (see FIGURE 2).

Although the central body portion 12 of the drum 10 has been shown to include the spiralling channel groove 24 for the purpose of directionally guiding the oncoming cable, it is to be understood that such body portion may be devoid of such grooves so that the peripheral surface presented to the oncoming cable is completely smooth. In such an embodiment, it would be desirable to provide some sort of reciprocating guide for continually locating the next revolution of cable. It is to be understood, however, that where the spiralling channel groove 24 is employed, the grooves 26 are preferably of sufficient depth to receive the entire diametrical width of the cable 22 so that no potrion thereof extends above the raised surface 28.

FIGURE 2 is a view which includes the drum of FIGURE 1 and consequently similar reference characters have been used to identify similar elements. In FIGURE 2, the cable winding operation has progressed until the spiralling channel groove 24 on the central portion 12 is substantially filled with cable to form one layer thereon, with the cable 22 having simultaneously been guided to the opposite end of the body portion 12. At this point the rotation of the drum 10 is halted and two semi-cylindrically shaped shells 34 and 36 are removably secured to the central portion 12 by means of screws 37 which pass through aligned slots in the drum and shells into wing-nuts 39 in a manner to be described in greater detail. Shells 34 and 36 are preferably constructed of a lightweight material such as aluminum or an aluminum alloy and are generally rigid in nature. Each of the shells is provided with a plurality of helical grooves 38 which when aligned with the grooves 38 of the other shell, in a manner to be more fully described, cooperate to define a spiralling externally threaded surface whose direction of thread, or pitch, is opposite to the pitch of the spiralling channel groove 24 of body portion 12. In FIGURE 2 it can be seen that the grooves 38 of shell 36 are preferably spaced extremely close together to accommodate as much cable as possible. The grooves 38 of shell 34 are similarly spaced in actual use, but for purposes of simplification and illustration in the drawings have been shown as being widely spaced. The grooves 38 are sufficiently deep so that cable 22 residing therein does not extend beyond the outer peripheral surface of the shell. Shells 34 and 36 are of identical construction and are tapered at the entrance to each channel groove as at 40 to facilitate the entry of cable therein when the shell is used in the position corresponding to shell 34 wherein it is necessary for the cable 22 to be guided thereon.

With the drum wound to the extent shown in FIGURE 2, and then halted, the shells 34 and 36 are placed on the central portion 12 with one of the tapered edge surfaces 40 of shell 34 positioned under the extending cable 22. Shell 36 is simultaneously positioned so that the grooves 38 thereof are aligned with the grooves 38 of shell 34. Upon further rotation of drum 10 the cable 22 will be guidingly wound in a direction corresponding to arrow 42 until there is a complete layer of cable residing within the grooves 38 of shells 34 and 36. At such time the extending cable 22 will now intersect the longitudinal axis of the drum 10 at essentially the same position as it began in FIGURE 1 (see FIGURE 3).

Figure 3:
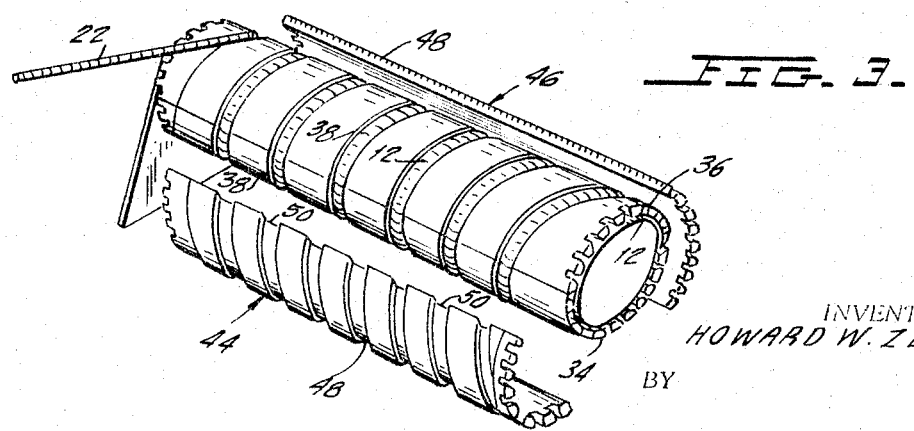
FIGURE 3 is a view similar to that shown in FIGURES 1 and 2, but showing the two shells of FIGURE 2 positioned on the surface of the take-up drum and filled with one layer of cable. Also shown is the contemplated placement of shells similar to those shown in FIGURE 2.

In FIGURE 3 a layer of cable 22 has filled the helical grooves 38 of shells 34 and 36 while simultaneously the cable 22 has been directed to the opposite side of the central body portion 12. At this point rotation is halted once again and semi-cylindrically shaped shells 44 and 46 are adjustably and removably secured to shells 34 and 36 of the inter-layer below in a manner to be described in greater detail. Shells 44 and 46 are similar to shells 34 and 36, only larger, and include a plurality of helical grooves 48 (exaggerated on shell 44) which when aligned cooperate to define a spiralling groove for guidingly winding the next layer of cable. The shells include the tapered entrances 50 for facilitating the entry of cable therein, but differ from the shells 34 and 36 in that the direction of thread or pitch is reversed so that upon subsequent rotation the cable will be reversed and directed toward the final position of the cable shown in FIGURE 2.

When the helical grooves 48 of shells 44 and 46 are completely filled the drum is halted and another set of shells, similar to shells 34 and 36 of FIGURE 2, only larger, are removably secured to shells 44 and 46 to threadably guide the next layer of cable in the direction indicated by arrow 42 in FIGURE 2. Thus it can be seen that by successively placing reversed threaded pairs of shells on the central portion 12 of drum 10, the cable 22 will be smoothly and evenly wound upon the drum while at the same time having successively reversed in direction to eliminate the necessity of the separate reciprocating guiding arrangement prevalent in the prior art.

In FIGURE 4 there is shown a detailed view of the shell 34 of FIGURE 2. Although shell 34 has been chosen to illustrate the manner in which successive layers of shells may be joined to the drum and each other, it is to be understood that the detailed structure which follows is identically provided on the drum and each of the shells used in the cable drum system regardless of the direction of pitch of the helical grooves provided on its exterior surface.

The edges 52 and 54 of shell 34 which are transverse to the longitudinally extending tapered entrances 40 are each provided with a plurality of open-ended longitudinally extending slots 56. Each slot is provided with an enlarged opening 58 at the underside thereof (see FIGURE 5), which opening is sufficient to accommodate the large head portion 60 of screw 37.

As can be seen in FIGURE 5, successive layers of shells 34, 44 are secured to the rum 12 and one another by passing the screw 37 through aligned slots 56 of the drum and successive layers of shells. Since the entire edge surface of the drum and each shell is provided with slots 56, there is no difficulty in aligning slots in successive layers. Furthermore, since the slots 56 are elongated toward the center of the drum or shell, the shell may be positioned longitudinally with respect to the axis of the drum 10 so that the grooves 38 of the mating shells 34 and 36 may be aligned and furthermore so that one of the grooves 38 may be positioned to receive the incoming cable which is to form the first revolution of the new layer.

If desired, the butterfly wing-nut 39 may rigidly secure the shells in place. However, it is to be noted that such wing-nut is not mandatory since each succeeding layer of shell will be held in place by the layer of cable which surrounds it.

In FIGURE 6 is schematically illustrated the preferred relationship of the distance X which corresponds to the distance from a cable pulley 66 to the cable drum 10, and the pitch of the threaded grooves provided in the inter-layer shells described above. It can be seen that if pulley 66 were located in the dotted line position shown in FIGURE 6, the angle $\theta_2$ through which cable 22 would pass in being guided across the surface of the central portion 12, or subsequently applied layers of shells, would be much greater than the angle $\theta_1$ through which the cable would pass when the pulley is positioned at a distance X away from the drum 10. If the distance Y becomes too small, it is possible that the spiralling channel groove 24 or helical grooves 38 will fail to guide the oncoming cable. Therefore, the distance Y should be chosen sufficiently far from the drum 10 so that the cable may be completely guided in accordance with the teaching of the instant invention.

In FIGURES 7 and 8 are shown alternative methods for assuring that the channel groove 24 or the helical grooves of the inter-layer shells will guide the oncoming cable even where the space X in FIGURE 6 is unavailable. Specifically, in FIGURE 7 the frame 20 is secured to a base 21 which may rotate about a fixed anchor point 23. Thus when the cable 22 is approaching the end of the central groove-containing portion 12, the base 21 may rotate (as indicated by the phantom outline 21') to align the angle of the oncoming cable with the angle of the grooves.

FIGURE 8 is similar to FIGURE 7 but differs in that a base 23 may be translated by means of rotating arms 25. It is to be noted that the use of the floating drum arrangements of FIGURES 7 and 8 are advantageous where the distance X of FIGURE 6 is not available, or, in the alternative, will permit much longer shells where such space is available.

Although there has been described a preferred embodiment of this novel invention, many variations and modifications will now be apparent to those skilled in the art. Therefore, this invention is to be limited, not by the specific disclosure herein, but only by the appending claims.

What is claimed is:

1. A cable drum system comprising:
   a rotatable cable take-up drum having a core for the reception of one layer of a cable which is to be wound on said drum in response to rotation thereof; and
   a shell removably secured to said core, said shell receiving said cable when said core is substantially filled with said one layer of said cable, said shell remaining stationary relative to said core when it is secured thereto.

2. A cable drum system comprising:
   a rotatable cable take-up drum having a core for receiving and guiding a cable which is to be wound on said take-up drum in response to rotation thereof and
   a shell removably secured to said core, said shell having a plurality of helical channel grooves thereon for receiving and guiding said cable when said core is substantially filled wtih said cable, said shell remaining stationary relative to said core when it is secured thereto.

3. The cable drum system of claim 2, wherein said cable take-up drum is movable in a predetermined plane of motion to align the helical channel grooves of said shell with the cable being guidingly wound therein.

4. The cable drum system of claim 2, wherein said shell comprises a cylindrically shaped member having opposing longitudinal edges which extend parallel to the longitudinal axis of said drum, one of said longitudinal edges being tapered to facilitate the entry of cable thereon.

5. The cable drum system of claim 2, wherein said shell is adjustably positioned along the axis of said core to facilitate the entry of cable into said helical channel grooves.

6. The cable drum system of claim 2 wherein the peripheral surface of said core is provided with a spiralling channel groove, said spiralling channel groove and the helical channel grooves of said shell being directionally oriented with respect to each other to guide said cable in opposite directions.

7. A cable drum system comprising:
   a rotatable cable take-up drum having a core for the reception of one layer of a cable which is to be wound on said drum in response to rotation thereof; and
   a first plurality of semi-cylindrically shaped shells removably secured to said core, said first plurality of shells comprising a first and second shell each having a plurality of helical channel grooves on one surface thereof, said first and second shells being adjustably positioned along the longitudinal axis of said drum so that the helical channel grooves of said first shell are aligned with the helical channel grooves of said second shell, the grooves of said first and second shells cooperating to receive and guide said cable in a first direction when said spiralling channel groove of said core is substantially filled with said cable, said first and second shells remaining stationary relative to said core when they are secured thereto.

8. The cable drum system of claim 7 wherein said first and second shells are each provided with a plurality of longitudinally extending open-ended slots at each end thereof, said slots extending parallel to the longitudinal axis of said shells.

9. The cable drum system of claim 8 wherein each of said slots is provided with an enlarged opening on the surface opposite said one surface, said openings being adapted to receive the head of a screw which passes through said slot.

10. The cable drum system of claim 7 and further including a second plurality of semi-cylindrically shaped shells removably secured to said first plurality of shells, said second plurality of shells comprising a first and second shell each having a plurality of helical grooves on one surface thereof; said first and second shells of said second plurality of shells being adjustably positioned along the longitudinal axis of said core so that their helical grooves are aligned, the grooves of said first and second shells of said second plurality of shells cooperat g to receive and guide said cable in a direction opposite id first direction when the helical grooves of said first id second shells of said first plurality of shells are substantially filled with said cable, said first and second shells said second plurality of shells remaining stationary lative to said first plurality of shells when they are cured thereto.

11. The cable drum system of claim 10 wherein said st and second shells of said first and second plurality shells are each provided with a plurality of longitunally extending open-ended slots at each end thereof, id slots extending parallel to the longitudinal axis of id shells.

12. The cable drum system of claim 11 wherein each said slots is provided with an enlarged opening on the rface opposite said one surface, said openings being lapted to receive the head of a screw which passes rough said slots, said first and second shells of said second plurality of shells being secured to said first and second shells of said first plurality of shells by means of a rew, the stem portion of which passes through said one of said slots and an aligned slot in said second plurality of shells.

13. The cable drum system of claim 12 wherein each of said shells of said first and second plurality of shells comprises a semi-cylindrically shaped member having opposing longitudinal edges which extend parallel to the longitudinal axis of said core, a major portion of one of said longitudinal edges of each of said shells being tapered to facilitate the entry of cable thereon.

References Cited by the Examiner

UNITED STATES PATENTS

| 1,527,478 | 2/1925 | Harper | 242—117 |
| 2,802,638 | 8/1957 | Ireland | 242—117 |

FOREIGN PATENTS

| 27,047 | 6/1916 | Norway. |

EVON C. BLUNK, *Primary Examiner.*

H. C. HORNSBY, *Assistant Examiner.*

UNITED STATES PATENT OFFICE
CERTIFICATE OF CORRECTION

Patent No. 3,321,185                                           May 23, 1967

Howard W. Zenke

It is hereby certified that error appears in the above numbered patent requiring correction and that the said Letters Patent should read as corrected below.

In the heading to the printed specification, lines 4 and 5, for "assignor to Letco Engineering and Tool Company," read -- assignor to Zetco Engineering and Tool Company, --.

Signed and sealed this 28th day of November 1967.

(SEAL)
Attest:

Edward M. Fletcher, Jr.                                 EDWARD J. BRENNER
Attesting Officer                                             Commissioner of Patents